United States Patent [19]
Murphy

[11] Patent Number: 5,242,247
[45] Date of Patent: Sep. 7, 1993

[54] APPARATUS FOR LAYING PIPE

[76] Inventor: John H. Murphy, 24938 Inga Ave., Hampton, Minn. 55031

[21] Appl. No.: 863,209

[22] Filed: Apr. 3, 1992

[51] Int. Cl.[5] ............................................. F16L 1/00
[52] U.S. Cl. .................................. 405/154; 405/157; 248/49
[58] Field of Search ............... 405/154, 157, 158, 159, 405/172; 248/49, 125

[56] References Cited

U.S. PATENT DOCUMENTS

| | | | |
|---|---|---|---|
| 3,001,617 | 9/1961 | Clevett | 248/125 X |
| 3,533,583 | 10/1970 | Azim | 248/125 |
| 4,090,686 | 5/1978 | Yarbrough | 248/49 |
| 4,126,012 | 11/1978 | Waller | 405/157 |
| 4,252,466 | 2/1981 | Berti et al. | 405/172 |
| 4,348,989 | 9/1982 | Vik | 248/125 X |
| 4,389,034 | 6/1983 | Suttles | 248/49 |
| 4,498,662 | 2/1985 | Halter | 269/101 |
| 4,726,575 | 2/1988 | Dearmen | 269/43 |
| 4,765,577 | 8/1988 | Collins et al. | 248/59 |
| 4,913,582 | 4/1990 | Barrett | 404/119 |
| 4,932,391 | 6/1990 | Bierdeman | 248/125 X |
| 5,007,768 | 4/1991 | Waller | 405/154 |
| 5,042,458 | 8/1991 | Stenersen | 405/154 |

Primary Examiner—Dennis L. Taylor
Assistant Examiner—John Ricci
Attorney, Agent, or Firm—Palmatier, Sjoquist & Helget

[57] ABSTRACT

The invention relates to an apparatus for laying pipe and/or drainage tile at a desired depth below ground, and a preferred level grade within a trench. The invention maintains the placement of the pipe and, upon substantial completion of backfilling operations of the trench, may be removed for reuse. The invention includes a shaft having an adjustable sleeve and an adjustable pipe-grasping sleeve adapted for engagement to a variety of sized pipes and/or drainage tile. The invention may be securely placed into a trench by manual manipulation of the handles and/or by striking of the strike plate with a hammer. The invention is designed for fast and convenient removal from a trench.

22 Claims, 2 Drawing Sheets

APPARATUS FOR LAYING PIPE

BACKGROUND OF THE INVENTION

The present invention relates to an apparatus for use in laying pipe within a trench at a desired depth below grade.

In the past, problems have arisen in the laying of pipe and/or drainage tile in a trench. A problem has involved maintaining pipe and/or drainage tile at a desired depth below the surface of the ground. Generally, when a trench is excavated in the earth the depth of the trench will vary. The laying of pipe and/or drainage tile on the floor of the trench may therefore not initially place the pipe and/or drainage tile at a desired depth below the surface of the earth. The invention provides a workman with the option to quickly excavate a trench and use the adjustable features of the invention to maintain pipe and/or drainage tile at a uniform depth below the surface of the ground.

The invention also provides a workman with a convenient and easy method to correct errors which may have occurred in establishing the depth of a trench. A workman using the invention may easily adjust the invention to a desired depth. The workman is not limited to the use of the floor of the trench, or using filler material, when laying pipe and/or drainage tile. A workman is therefore not required to engage in hand shoveling work to excavate or backfill a portion of a trench in order to lay pipe and/or drainage tile at a desired depth below the surface of the ground.

Another problem with laying pipe involves positioning of drainage tile and/or pipe at a desired slope or level grade within a trench. It is difficult to excavate a trench with an exact ascending or descending level of grade in order to facilitate movement of liquids within the drainage tile and/or pipe. The invention provides a workman using a transit with a convenient, fast, and simple apparatus for positioning drainage tile and/or pipe at a desired ascending or descending level of grade within a trench. Workman are therefore not restricted or required to rely upon the time-consuming and costly process of excavating a trench and/or adding filler material to achieve a desired level of grade prior to laying of drainage tile and/or pipe. The use of a plurality of the invention in series solves the problem of positioning and maintaining pipe and/or drainage tile at a descending, or ascending, or level, grade.

Another problem involves maintaining pipe and/or drainage tile at a desired depth, level, or position during backfilling operations of the trench. Frequently pipe and/or drainage tile move from a preferred position or depth during backfilling operations of a trench. The invention solves this problem by securely maintaining drainage tile and/or pipe in a preferred location during backfilling operations of the trench. The invention may then be quickly and easily withdrawn from engagement to the pipe and/or drainage tile for reuse upon substantial completion of backfilling operations.

SUMMARY OF THE INVENTION

An object of the invention is to provide a pipe-laying apparatus for use in a trench of relatively simple and inexpensive design, construction, and operation which is safe, durable, and which fulfills the intended purpose without damage to the pipe and/or injuries to a workman.

Another object of the invention is to enhance and maximize the ease of placement of pipe and/or drainage tile within a trench at a desired depth below ground and/or a desired grade.

Still another object of the invention is to maintain pipe within a trench at a desired depth below grade, during backfilling operations of the trench.

Still another object of the invention is to maximize the ease and efficiency of removal of the pipe-laying apparatus during backfill operations in the trench.

A feature of the invention is a shaft having a spike for insertion into unexcavated ground at the bottom of the trench.

Another feature of the invention is a handle having a strike plate affixed to the top of the shaft providing the workman with alternative methods for insertion of the apparatus into a trench.

Still another feature of the invention includes a foot peg affixed to the bottom of the shaft providing a workman with the ability to set the invention to a preferred depth to stabilize the device in soft soils such as sand.

Still another feature of the invention includes an adjustable sleeve having a pipe support for maintaining pipe and/or drainage tile at a preferred depth within a trench.

Still another feature of the invention includes a T-screw and a handle affixed to the adjustable sleeve providing a workman with convenient means for positioning the adjustable sleeve to a preferred depth.

Still another feature of the invention includes a pipe-grasping sleeve having a grasping member adapted to secure a variety of sized pipes and/or drainage tile to the pipe support.

Still another feature of the invention includes a handle affixed to the pipe-grasping sleeve, providing a workman with a convenient method for engaging the grasping member to the pipe.

Still another feature of the invention includes a butterfly clamp affixed to the interior of the pipe-grasping sleeve adapted for slidable engagement to the adjustable sleeve, to secure the pipe against the holder.

Still another feature of the invention includes the precise sized and fixed interrelation between the shaft, adjustable sleeve, and the pipe-grasping sleeve, permitting either a clockwise or counterclockwise rotation of the invention about a vertical axis without slippage or disengagement between the respective elements.

DETAILED DESCRIPTION OF THE PREFERRED EMBODIMENTS

Figure 1:
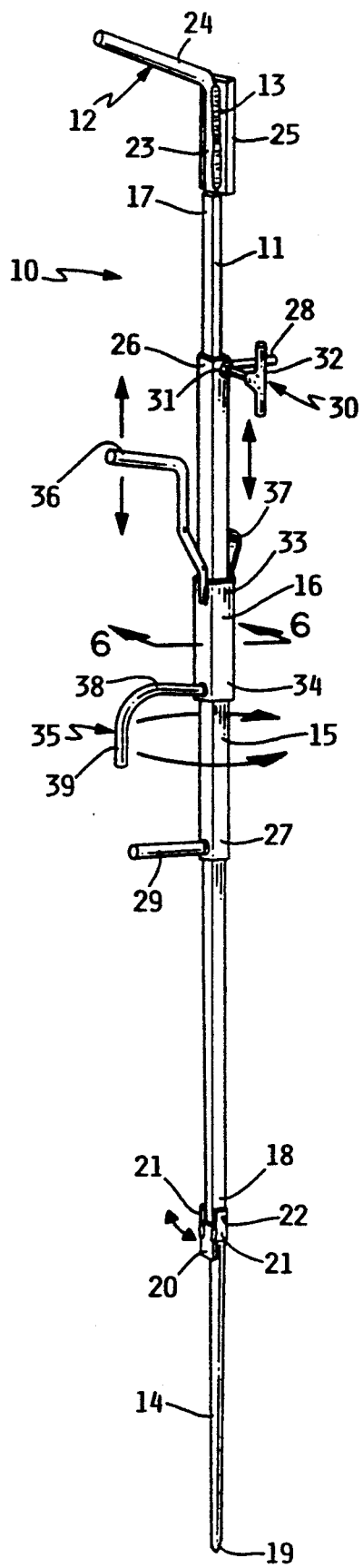
FIG. 1 is an isometric view of the adjustable pipe-holder apparatus.

One form of the invention is illustrated and described herein. The adjustable pipe-holder apparatus is indicated in general by the numeral 10. The adjustable pipe-holder apparatus 10 has a shaft 11, a first handle 12, a strike plate 13, a spike 14, an adjustable sleeve 15, and a pipe-grasping sleeve 16.

The adjustable pipe-holder apparatus 10 is used to position pipe and/or drainage tile 9 in a trench at a desired depth and a desired level of grade. As seen in FIG. 1, the shaft 11 is formed of a rigid, preferably square tubular metal. The shaft is generally 36 inches or 90 cm in length, ½" or 1.3 cm in width, and ¼ or 0.6 cm in thickness. These illustrative dimensions are not intended to be limiting but are to show the varied embodiments this invention may take. The length of the shaft may also vary depending upon the desired depth of the trench and other factors. The shaft is designed to be of sufficient strength and durability to not fracture, break, or bend when used by a workman to position pipe and/or drainage tile 9 in a trench. The metal material of the shaft 11 may be steel, 235 hard steel, galvanized metal, or any other rigid material providing strength or durability to the adjustable pipe-holder apparatus 10. The shaft 11 is preferably square to facilitate slidable engagement of the adjustable sleeve 15 while simultaneously preventing the adjustable sleeve 15 from rotating about a vertical axis of symmetry with respect to the shaft 11. The shaft 11 has a top portion 17 and a bottom portion 18.

The spike 14 is preferably affixed to the bottom portion 18 of the shaft 11 by welding. The spike 14 depends vertically from the bottom portion 18 of the shaft 11, defining a vertical axis of symmetry for the adjustable pipe-holder apparatus 10. The spike 14 is preferably 10" or 25.4 cm in length having a width of 5/16" or 0.6 cm. The spike 14 is a solid metal rod having a point 19. The solid metal rod material of the spike 14 may be formed of the same or different material as the shaft 11. The spike 14 may also vary in length and width depending upon the soil conditions encountered in an excavated trench. The point 19 of the spike 14 is designed for forceful penetration into the unexcavated floor of a trench during use of the adjustable pipe-holder apparatus 10 while laying pipe and/or drainage tile 9. The point 19 may be milled, raised, and/or ground into the metal spike 14 at the preference of an operator. The point 19 promotes the ease of insertion of the adjustable pipe-holder apparatus 10 into the unexcavated floor of a trench by a workman. The spike 14 may vary in length and width dimensions depending upon the type of soil to be penetrated during use of the adjustable pipe-holder apparatus 10.

Figure 2:
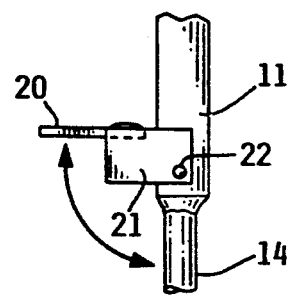
FIG. 2 is an exploded view of the foot support.

A foot peg 20 is pivotally affixed to the adjustable pipe-holder apparatus 10. The foot peg 20 includes a pair of peg supports 21. The peg supports 21 are pivotally attached to the bottom portion 18 of the shaft 11 by a pivot pin 22. (FIGS. 1 and 2). The peg supports 21 are preferably affixed to opposite sides of the shaft 11 for straddling relation thereto. The foot peg 20 is preferably affixed to the peg supports 21 by welding. In operation, the foot peg 20 may be pivotally manipulated upward with respect to the vertical axis via the pivotal mounting of the peg supports 21 to the shaft 11. Upward pivotal movement of the foot peg 20 will be terminated upon engagement between the foot peg 20 and the shaft 11. Preferably upon complete upward vertical pivotal rotation the foot peg 20 is perpendicular to the shaft 11. Preferably upon complete downward vertical pivotal rotation the foot peg 20 fits flushly against the shaft 11 and the spike 14. The foot peg 20, including the pair of peg supports 21, are formed of sturdy metal.

Figure 3:
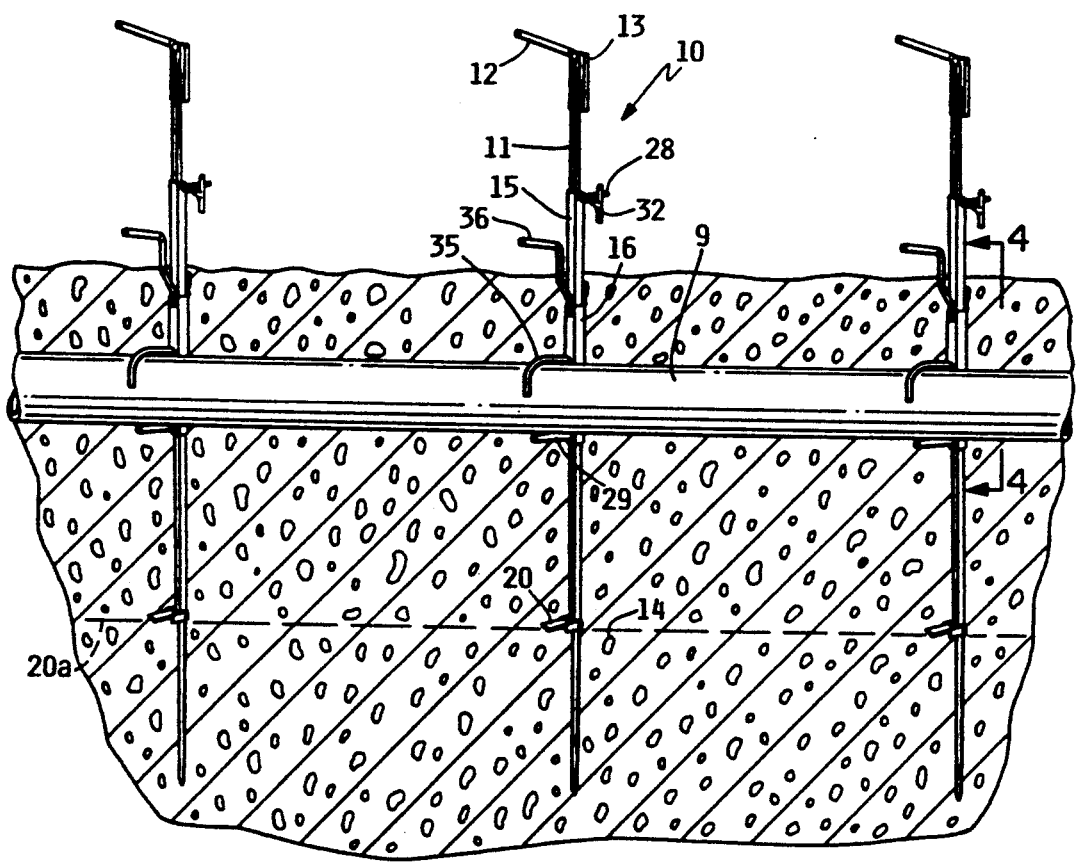
FIG. 3 is a cross-section view showing a series of the adjustable pipe-holder apparatus engaged to pipe and/or drainage tile in a backfilled trench.

The foot peg 20 may be used by a workman to stabilize the adjustable pipe-holder apparatus 10 to a preferred depth following the insertion of the adjustable pipe-holder apparatus 10 into the floor of a trench, as shown in FIG. 3 with reference to the depth line 20a. To adjust the height of the adjustable pipe-holder apparatus 10 upward, a workman may pivotally rotate the foot peg 20 upward until engagement occurs with the shaft 11. Upon completion of upward elevation of the adjustable pipe-holder apparatus 10 the workman may pivotally rotate the foot peg 20 downward for engagement to the shaft 11 and the spike 14 during storage.

A first handle 12 is fixedly attached to the top portion 17 of the shaft 11 by welding. The length and width dimensions of a first handle 12 may vary according to the preference of an operator so long as the structural integrity of the first handle 12 and the adjustable pipe-holder apparatus 10 is not sacrificed. The first handle 12 may be formed of the same or different sturdy metal rod material as the spike 14.

The first handle 12 is of one-piece construction having a vertical portion 23 and a horizontal portion 24. The vertical and horizontal portions 23 and 24 respectively of the first handle 12 may be formed by bending. Preferably the vertical portion 23 of the first handle 12 is welded to and extends vertically upward from the top portion 17 of the shaft 11. The vertical portion 23 of the first handle 12, the shaft 11, and the spike 14 define the vertical axis of symmetry for the adjustable pipe-holder apparatus 10. The horizontal portion 24 of the first handle 12 extends substantially perpendicular to the vertical portion 23 of the first handle 12 and the vertical axis of the adjustable pipe-holder apparatus 10.

A desired length of the vertical portion 23 of the first handle 12 may inserted into the top portion 17 of the square tubular shaft 11 for suitable engagement thereto. The horizontal portion 24 of the first handle 12 may be coated with plastic and/or rubber to provide a comfortable, slip-free gripping surface to a workman. The first handle 12 may be used by workmen for insertion of the adjustable pipe-holder apparatus 10 into the floor of a trench and/or adjustment of the depth or level of the adjustable pipe-holder apparatus 10 following insertion of the adjustable pipe-holder apparatus 10 into the earth.

A strike plate 13 is affixed to the vertical portion 23 of the first handle 12 by welding. The strike plate 13 has opposite edges 25. The strike plate 13 is preferably welded to the vertical portion 23 of the first handle 12 equal distances between the opposite edges 25. The strike plate 13 is parallel to the vertical axis of symmetry of the adjustable pipe-holder apparatus 10 over its entire length.

The strike plate 13 provides a workman with an alternative method of insertion of the adjustable pipe-holder apparatus 10 into the unexcavated floor of a trench. A workman may grasp the horizontal portion 24 of the first handle 12 with one hand and vertically strike the strike plate 13 with a hammer or sledge hammer with the other hand for vertical penetration of the spike 14 into the unexcavated floor of the trench. A workman is therefore not limited to use of the first handle 12 and/or foot peg 20 for insertion of the adjustable pipe-holder apparatus 10 in a trench and is provided with the opportunity to use a hammer or sledge hammer which significantly improves the ease of penetration of the adjustable pipe-holder apparatus 10 into the soil.

An adjustable sleeve 15 is preferably engaged to the shaft 11. The adjustable sleeve 15 is preferably formed of rigid and sturdy square tubular metal of the same or different metal material as the shaft 11. The adjustable sleeve 15 is preferably 5/8" or 1.5 cm in diameter and is adapted for sliding engagement over the shaft 11. During assembly of the adjustable pipe-holder apparatus 10, the shaft 11 may be manipulated for sliding penetration through the diameter of the adjustable sleeve 15 prior to the affixation of the first handle 12 and the strike plate 13 to the top portion 17 of the shaft 11. The adjustable sleeve 15 is also preferably adapted for slidably and fixed positioning to the shaft 11 between the foot peg 20 and the strike plate 13.

The adjustable sleeve 15 preferably has a first side 26, a second side 27, a second handle 28, a pipe support 29, a first clamp 30, and a threaded aperture (not shown). The first side 26 of the adjustable sleeve 15 is preferably positioned proximal to said top portion 17 of said shaft 11, and said second side 27 of said adjustable sleeve 15 is preferably positioned proximal to said bottom portion 18 of said shaft.

The purpose of the adjustable sleeve 15 is to provide a workman with a convenient, fast, adjustable mechanism for establishing the level of pipe and/or drainage tile 9 following secure penetration of the adjustable pipe-holder 10 into the unexcavated floor of a trench. The adjustable sleeve 15 may be manipulated by a workman to a desired depth without adjustment of the adjustable pipe-holder apparatus 10 following placement into a trench. The adjustable sleeve 15 is designed for vertical slidable engagement with the shaft 11. Horizontal rotational movement of the adjustable sleeve 15 with respect to the shaft 11 is prevented by the interacting features of the diameter of the adjustable sleeve 15, the square tubular shape of the shaft 11, and the square tubular shape of the adjustable sleeve 15, following insertion of the shaft 11 through the adjustable sleeve 15.

The adjustable sleeve 15 significantly improves a workman's ability to manipulate pipe and/or drainage tile to a desired depth within a trench by eliminating the necessity for adjustment of the entire adjustable pipe-holder apparatus 10.

The pipe support 29 is preferably affixed to the second side 27 of the adjustable sleeve 15 by welding. The pipe support 29 is formed of the same or different solid metal rod material as the spike 14 and the first handle 12. The pipe support 29 preferably extends perpendicular to the adjustable sleeve 15 and the vertical axis of symmetry of the adjustable pipe-holder apparatus 10. The pipe support 29 may preferably be increased in length and/or width diameter to accommodate use with varied size drainage tile and/or pipe 9 so long as the structural strength and durability of the adjustable pipe-holder apparatus 10 is not sacrificed. The pipe support 29 is also preferably affixed to the adjustable sleeve 15 so as to extend perpendicular to the vertical axis of symmetry of the adjustable pipe-holder apparatus 10 in the same direction as the first handle 12. The first handle 12 and the pipe support 29 are thereby preferably maintained in a vertical planar relationship to each other.

The pipe support 29 preferably functions to provide a support for maintaining a desired section of pipe and/or drainage tile 9 at a preferred depth within the trench. The adjustable sleeve 15 may be vertically manipulated so that pipe support 29 maintains the pipe and/or drainage tile 9 at the desired depth. The pipe support 29 in conjunction with the adjustable sleeve 15 significantly improves a workman's ability to lay pipe.

The second handle 28 is preferably affixed to the first side 26 of the adjustable sleeve 15 by welding. The second handle 28 is formed of the same or different solid metal rod material as the spike 14, first handle 12, and/or pipe support 29. The second handle 28 preferably extends perpendicular to the adjustable sleeve 15 and the vertical axis of symmetry of the adjustable pipe-holding apparatus 10. The second handle 28 may be increased in length and/or width diameter to accommodate the preferences of an operator, so long as the structural strength or durability of the adjustable pipe-holder apparatus 10 is not sacrificed. The second handle 28 may be coated with plastic or rubber to provide a comfortable, slip-free gripping surface to a workman. The second handle 28 may be used by a workman for manipulation of the adjustable sleeve 15 and the pipe support 29 to a desired depth in a trench. The second handle 28 is preferably affixed to the adjustable sleeve 15 so as to extend perpendicular to the vertical axis of symmetry of the adjustable pipe-holder apparatus 10 opposite the first handle 12 and the pipe support 29. The second handle 28, the first handle 12, and the pipe support 29 are preferably maintained in a vertical planar relationship to each other.

A threaded aperture (not shown) preferably traverses the first side 26 of the adjustable sleeve 15, and is adapted for receiving engagement of the threaded handle 32, to form a first clamp 30. The first clamp 30 preferably extends perpendicular from the adjustable sleeve 15. The first clamp 30 also extends perpendicular to the vertical axis of symmetry of the adjustable pipe-holder apparatus 10 and is perpendicular to the vertical plane of symmetry between the first handle 12, second handle 28, and pipe support 29. The first clamp 30 is designed to provide a workman With a convenient and easy mechanism for securing the adjustable sleeve 15 in a desired location following vertical adjustment with respect to the shaft 11. A workman may grasp and rotate the T-shaped handle 32 in order to engage the threaded end 31 to the shaft 11. The pressure exerted by rotating the T-shaped handle 32 and threaded end 31 upon the shaft 11 is preferably sufficient to maintain the adjustable sleeve 15, having the pipe support 29, at a desired depth. The first clamp 30 of the adjustable sleeve 15, when engaged to the shaft 11, is also of sufficient strength to maintain the pipe support 29 in a desired location when the pipe support 29 is providing a platform for pipe and/or drainage tile 9. The first clamp 30, thereby, significantly enhances a workman's ability to position the adjustable sleeve 15 at a desired level upon the shaft 11. The first clamp 30 may be embodied in other forms and the illustrated method provided herein is not intended to be limiting but is provided to show the varied embodiments this invention may take.

A pipe-grasping sleeve 16 is preferably engaged to the adjustable sleeve 15. The pipe-grasping sleeve 16 is preferably formed of a rigid, sturdy square tubular metal of the same or different metal material as the adjustable sleeve 15. The pipe-grasping sleeve 16 is preferably ¾" or 2.1 cm in diameter and is adapted for sliding engagement over the adjustable sleeve 15. During assembly of the adjustable pipe-holder apparatus 10 the adjustable sleeve 15 may be manipulated for sliding penetration through the diameter of the pipe-grasping sleeve 16 prior to affixation of the second handle 28, pipe support 29, and the first clamp 30. The pipe-grasping sleeve 16 is also preferably adapted for slidable in-fixed positioning to the adjustable sleeve 15 between the pipe support 29 and the first clamp 30.

The pipe-grasping sleeve 16 preferably has an upper portion 33, a lower portion 34, a grasping member 35, a third handle 36, and a second clamp 37. The upper portion 33 of the pipe-grasping sleeve 16 is preferably positioned proximal to the first side 26 of the adjustable sleeve 15, and said lower portion 34 of the pipe-grasping sleeve 16 is preferably positioned proximal to the second side 27 of the adjustable sleeve 15.

The purpose of the pipe-grasping sleeve 16 is to provide a workman with a convenient, fast, and adjustable mechanism for securing pipe and/or drainage tile 9 in a desired location during backfilling operations in a trench. The pipe-grasping sleeve 16 may be manipulated by workman for engagement between the grasping member 35 and the pipe and/or drainage tile 9. The pipe-grasping sleeve 16 is designed for vertical slidable engagement with the adjustable sleeve 15. Horizontal rotational movement of the pipe-grasping sleeve 16 with respect to the adjustable sleeve 15 is prevented to the interacting features of the diameter of the pipe-grasping sleeve 16, the square tubular shape of the adjustable sleeve 15, and the square tubular shape of the pipe-grasping sleeve 16, following insertion of the adjustable sleeve 15 through the pipe-grasping sleeve 16.

The pipe-grasping sleeve 16 significantly improves a workman's ability to maintain secure engagement between the pipe and/or drainage tile 9 and the pipe support 29, via the grasping member 35 during backfilling operations of a trench. The pipe and/or drainage tile 9 is thereby maintained at a desired depth, significantly improving the usefulness of the adjustable pipe-holder apparatus 10.

The grasping member 35 is preferably affixed to the lower portion 34 of the pipe-grasping sleeve 16 by welding. The grasping member 35 is preferably formed of the same and/or different sturdy solid metal rod material as the spike 14, first handle 12, second handle 28, and pipe support 29. The length and width dimensions of the grasping member 35 may vary so long as the structural strength and integrity of the grasping member 35 and the adjustable pipe-holder apparatus 10 is not sacrificed.

The grasping member 35 is of one-piece construction having a horizontal section 38 and a vertical depending section 39. The horizontal section 38 and the vertical depending section 39 are preferably formed by bending. Preferably the horizontal section 38 of the grasping member 35 is welded to and extends horizontally perpendicular from the lower portion 34 of the pipe-grasping sleeve 16. The vertical depending section 39 of the grasping member 35 preferably extends substantially parallel to the vertical axis of symmetry of the adjustable pipe-holder apparatus 10. The horizontal section of the grasping member 35 may be 4" or 10.5 cm in length and the vertically-depending section 39 the grasping member 35 may be 3" or 8 cm in length. The grasping member 35 may preferably be increased in length and/or width diameter to accommodate use with various sized drainage tile and/or pipe 9 so long as the structural strength and durability of the adjustable pipe-holder apparatus is not sacrificed. The grasping member 35 is also preferably affixed to the pipe-grasping sleeve 16 so as to extend perpendicular to the vertical axis of symmetry for the adjustable pipe-holder apparatus 10 in the same direction as the first handle 12 and the pipe support 29. The first handle 12, the pipe support 29, and the second handle 28 thereby preferably maintained in a vertical planar relationship to each other.

Figure 4:
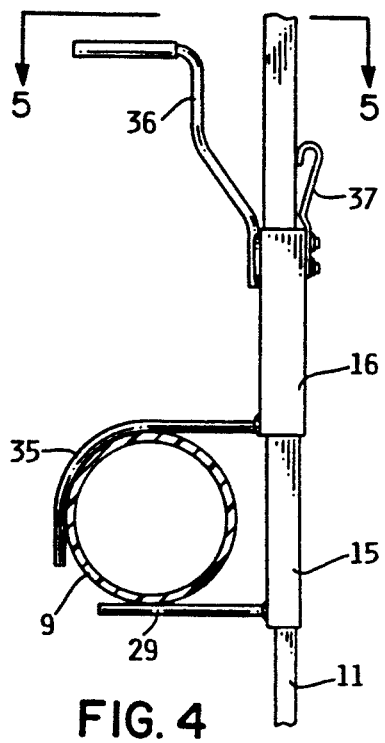
FIG. 4 is partial cross-sectional side view of the adjustable pipe-holder apparatus taken along the line of 4—4 of FIG. 3.
Figure 5:
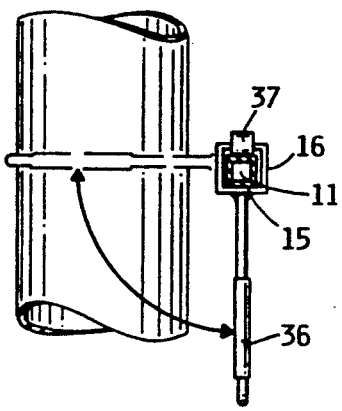
FIG. 5 is a partial cross-sectional top view of the adjustable pipe-holder apparatus taken along the line of 5—5 of the FIG. 4.

The grasping member 35 preferably functions to provide a mechanism for securing pipe and/or drainage tile 9 to the pipe support 29 during backfilling operations in the trench. (FIGS. 3,4) The pipe-grasping sleeve 16 may be vertically manipulated upward in order for the grasping member 35 to provide sufficient space for positioning of pipe and/or drainage tile 9 upon the pipe support 29. The pipe-grasping sleeve 16 may then be vertically manipulated downward for engagement between the grasping member 35 and the pipe and/or drainage tile 9. The grasping member 35 with the vertical depending section 39, maintains the pipe and/or drainage tile 9 in a desired location established by the pipe support 29. The pipe and/or drainage tile 9 is securely held in position between the grasping member 35 and the pipe support 29. A trench may then be backfilled without fear of movement of the pipe and/or drainage tile 9 within the trench.

The third handle 36 is preferably affixed to the upper portion 33 of the pipe-grasping sleeve 16 by welding. The third handle 36 is formed of the same or different solid metal rod material as the spike 14, first handle 12, pipe support 29, and grasping member 36. The third handle 36 preferably extends outward and upward from the upper portion 33 of the pipe-grasping sleeve 16. The third handle 36 then preferably extends horizontally substantially perpendicular to the vertical axis of symmetry of the adjustable pipe-holder apparatus 10. The third handle 36 may be varied in length and/or width diameter to accommodate the preferences of an operator so long as the structural strength and durability of the adjustable pipe-holder apparatus 10 is not sacrificed. The third handle 36 may be coated with plastic and/or rubber to provide a comfortable, slip-free gripping surface to a workman. The third handle 36 may be used by a workman to manipulate the pipe-grasping sleeve 16 and the grasping member 35 for securing the pipe and/or drainage tile 9 to the adjustable pipe-holder apparatus 10 at a desired location within a trench. The third handle 36 is preferably affixed to the pipe-grasping sleeve 16 so as to extend substantially perpendicular to the vertical axis of symmetry for the adjustable pipe-holder apparatus 10 on the same side of the first handle 12, grasping member 36, and pipe support 29. The first handle 12, third handle 36, grasping member 35, and pipe support 29 are preferably maintained in a vertical planar relationship to each other. The shape of the third handle 36 is preferably formed by bending.

Figure 6:
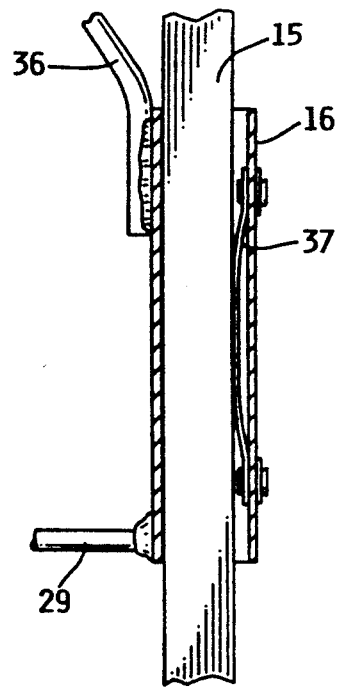
FIG. 6 is a partial cross-sectional side view of the pipe-grasping sleeve taken along the line of 6—6 of the FIG. 1.

A second clamp 37 preferably slidably affixes the pipe-grasping sleeve 16 to the adjustable sleeve 15. The second clamp 37 may be of a spring clip as illustrated in FIG. 1, or may be a butterfly clamp as illustrated in FIG. 6, or another form of a spring-loaded clamp. The second clamp 37 is preferably of sufficient strength and durability to maintain the pipe-grasping sleeve 16 in a desired location during backfilling operations of a trench.

As seen in FIG. 1 the second clamp 37 is affixed to the upper portion 33 of the pipe-grasping sleeve 16 by welding. The second clamp 37 engages the adjustable sleeve 15 opposite the third handle 36 above the pipe-grasping sleeve 16, providing for securable, slidable, and exterior engagement thereto.

As seen in FIG. 6, the second clamp 37 is centrally affixed to the interior of the pipe-grasping sleeve 16 and is adapted for securable and slidable interior engagement to the adjustable sleeve 15.

The second clamp 37 may be affixed to the pipe-grasping sleeve 16 by any suitable means including but not limited to welding and/or rivets. The second clamp 37 is preferably formed of a sturdy metal material. The second clamp 37 is designed to provide for slidable, vertical adjustment of the pipe-grasping sleeve 16 on the adjustable sleeve 15 for manipulative engagement between the grasping member 35 and the pipe and/or drainage tile 9. The second clamp 37 does not permit any horizontal rotational movement between the pipe-grasping sleeve 16 and the adjustable sleeve 15.

In operation a workman may use a plurality of the adjustable pipe-holder apparatus 10 as illustrated in FIG. 3. A workman may initially insert a plurality of the adjustable pipe-holder apparatus 10 in series, in the unexcavated floor of a trench, by either downward hand pressure upon the first handle 12 or striking the strike plate 13 with a sledge hammer. A workman may then use a transit to determine the desired depth for placement of pipe and/or drainage tile 9. A workman may then loosen the first clamp 30 and manipulate the adjustable sleeve 15 so that the pipe support 29 is positioned at the desired level. The first clamp 30 may then be tightened, securely affixing the adjustable sleeve 15 to the shaft 11. The pipe-grasping sleeve 16 may then be grasped via the third handle 36 and upwardly moved to disengage the grasping member 35 from the pipe support 29. The pipe and/or drainage tile 9 may then be placed upon the pipe support 29. A workman may then grasp the third handle 36 and downwardly adjust the pipe-grasping sleeve 16 for secure engagement between the grasping member 35 and the pipe and/or drainage tile 9. Backfilling operations may then be commenced in the trench. Backfilling operations may occur up to the level of the third handle 36. A workman will then step into the substantially backfilled trench and grasp the third handle 36 for vertical upward manipulation of the pipe-grasping sleeve 16, which in turn disengages the grasping member 35 from the pipe and/or drainage tile 9. A workman may then grasp the first handle 12 and the second handle 28 and rotate the adjustable pipe-holder apparatus 90 degrees. The vertical planar relationship between the first handle 12, second handle 28, third handle 36, pipe support 29, and grasping member 35 will then be substantially parallel to the pipe and/or drainage tile 9. The adjustable pipe-holder apparatus 10 may then be vertically lifted out of the soil by a workman for repeated use. Completion of backfilling operations of the trench may then be implemented as desired. The pipe and/or drainage tile 9 are thereby maintained within a trench at a desired depth below ground and a desired level grade with respect thereto.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An adjustable pipe-holder apparatus comprising:
   a) a shaft having a top end, bottom end, and an axis;
   b) a sharpened point affixed to said bottom end of said shaft;
   c) a first handle affixed to said shaft;
   d) a strike plate affixed to said first handle;
   e) an adjustable sleeve adapted for engagement to said shaft between said spike and said strike plate, said adjustable sleeve having a second handle, a pipe support, and a first clamp attaching said adjustable sleeve to said shaft;
   f) a pipe-grasping sleeve adapted for engagement to said adjustable sleeve, said pipe-grasping sleeve having a grasping member, a third handle, and a second clamp attaching said pipe-grasping sleeve to said adjustable sleeve, where said grasping member and said pipe support releasably hold pipe in a desired location.

2. The adjustable pipe-holder apparatus according to claim 1, wherein said shaft is formed of square tubular metal.

3. The adjustable pipe-holder apparatus according to claim 2, wherein said spike further comprises a pointed end.

4. The adjustable pipe-holder apparatus according to claim 3, wherein said first handle extends perpendicular to said axis.

5. The adjustable pipe-holder apparatus according to claim 4, wherein said strike plate is formed of rectangular solid metal affixed to said first handle by welding.

6. The adjustable pipe-holder apparatus according to claim 5, wherein said adjustable sleeve is formed of square tubular metal.

7. The adjustable pipe-holder apparatus according to claim 6, wherein said adjustable sleeve further comprises a first side and a second side, said adjustable sleeve being further adapted for slidable engagement to said shaft between said spike and said strike plate, said second handle affixed to said adjustable sleeve proximal said first side extending perpendicular to said axis, said first side of said adjustable sleeve proximal to said top of said shaft, said pipe support affixed to said adjustable sleeve proximal said second side, said pipe support extending perpendicular to said axis.

8. The adjustable pipe-holder apparatus according to claim 7, wherein said pipe-grasping sleeve further comprises an upper portion and a lower portion, said pipe-grasping sleeve further adapted for slidable engagement to said adjustable sleeve between said pipe support and said first clamp, said grasping member affixed to said pipe-grasping sleeve proximal to said lower portion initially extending perpendicular to said axis then depending downward parallel to said axis further adapted for engagement to said pipe support, said third handle affixed to said pipe-grasping sleeve proximal said upper portion initially extending parallel to said axis then extending perpendicular to said axis.

9. The adjustable pipe-holder apparatus according to claim 8, wherein said second clamp further comprises a spring clip.

10. The adjustable pipe-holder apparatus according to claim 8, wherein said second clamp further comprises a butterfly clip.

11. The adjustable pipe-holder apparatus according to claim 8, wherein said adjustable pipe-holder apparatus may be pivotally rotated about said axis.

12. The adjustable pipe-holder apparatus according to claim 8, wherein said first handle, second handle, third handle, grasping member, and pipe support are in planar relationship to each other.

13. An adjustable pipe-holder comprising:
   a) an elongate shaft having a top, bottom, and an axis;
   b) a sharpened point affixed to and depending from said bottom of said shaft;
   c) a first handle affixed to said top of said shaft;
   d) a strike plate affixed to said first handle;
   e) an adjustable sleeve having a first side and a second side, said adjustable sleeve adapted for slidable engagement to said shaft between said spike and said strike plate, said adjustable sleeve having a pipe support proximal to said second side, said adjustable sleeve further having a second handle proximal to said first side, said adjustable sleeve further having a screw clamp proximal to said second handle affixing said adjustable sleeve to said shaft, said screw clamp having a T-shaped grasp; and
   f) a pipe-grasping sleeve having an upper portion and a lower portion, said pipe-grasping sleeve adapted for slidable engagement to said adjustable sleeve between said screw clamp and said pipe support, said pipe-grasping sleeve having a grasping member affixed to said lower portion of said pipe-grasping sleeve, said grasping member adapted for engagement to said pipe support, said pipe-grasping sleeve having a third handle affixed to said upper portion of said pipe-grasping sleeve, said pipe-grasping sleeve further having a spring clamp adapted for slidable engagement to said adjustable sleeve.

14. The adjustable pipe-holder apparatus according to claim 13, wherein said shaft is formed of square tubular metal.

15. The adjustable pipe-holder apparatus according to claim 14, wherein said first handle extends perpendicular to said axis.

16. The adjustable pipe-holder apparatus according to claim 15, wherein said strike plate is formed of rectangular solid metal affixed to said first handle by welding.

17. The adjustable pipe-holder apparatus according to claim 16, wherein said adjustable sleeve is formed of square tubular metal.

18. The adjustable pipe-holder apparatus according to claim 16, wherein said pipe support extends from said adjustable sleeve perpendicular to said axis and said second handle extends from said adjustable sleeve perpendicular to said axis.

19. The adjustable pipe-holder apparatus according to claim 18, wherein said pipe-grasping sleeve is formed of square tubular metal.

20. The adjustable pipe-holder apparatus according to claim 19, wherein said grasping member initially extends from said pipe-grasping sleeve perpendicular to said axis then depends parallel to said axis, and said third handle initially extends parallel to said axis then extends perpendicular to said axis.

21. The adjustable pipe-holder apparatus according to claim 20, wherein said second clamp further comprises a spring clip.

22. The adjustable pipe-holder apparatus according to claim 20, wherein said second clamp further comprises a butterfly clip.

* * * * *